April 16, 1968  J. P. OLIVER  3,378,026
LUBRICATED VALVE WITH MEANS TO RELIEVE
EXCESSIVE SEALANT PRESSURE
Filed March 26, 1964
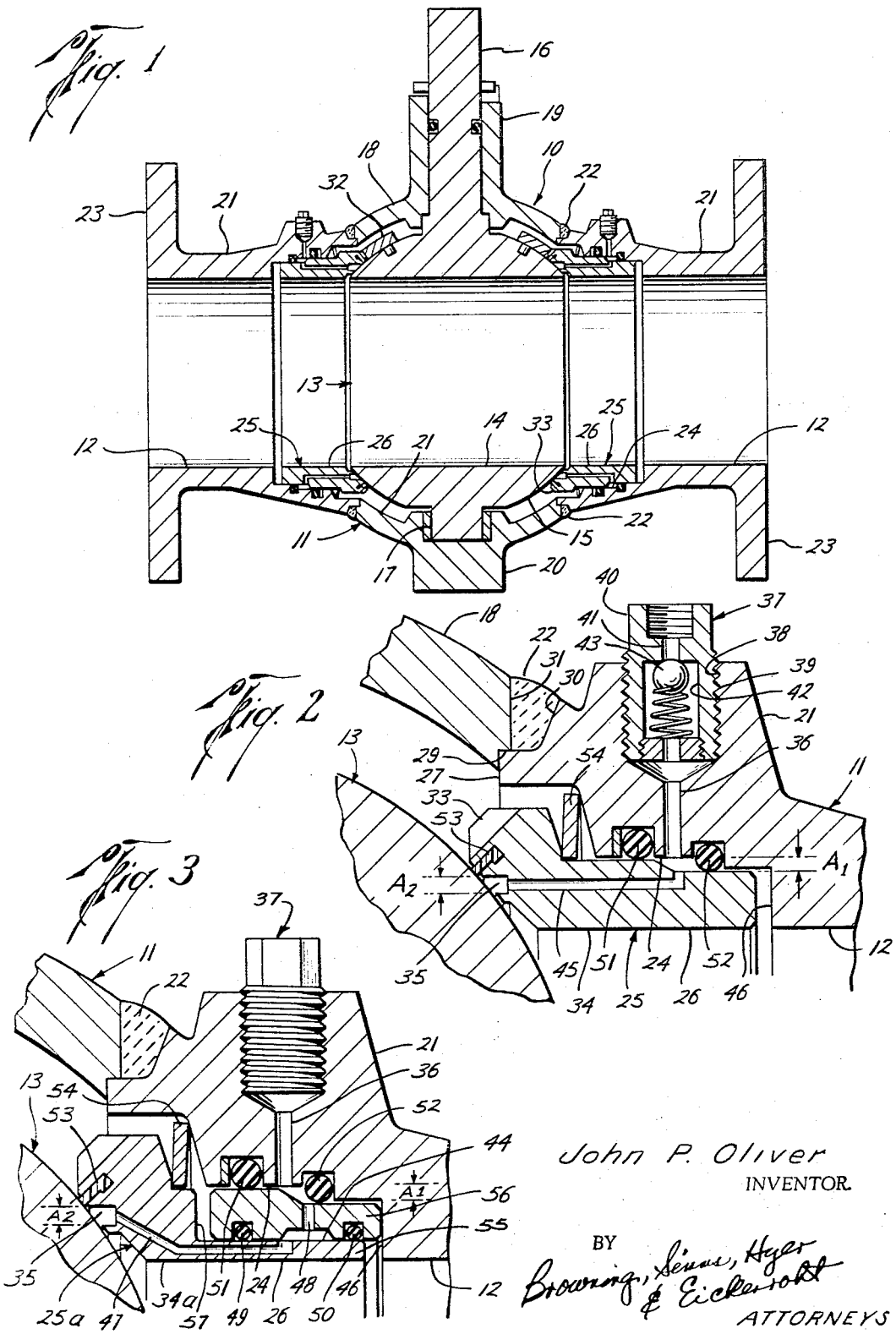
John P. Oliver
INVENTOR.
BY Browning, Simms, Hyer
& Eickenroht
ATTORNEYS

United States Patent Office 3,378,026
Patented Apr. 16, 1968

3,378,026
LUBRICATED VALVE WITH MEANS TO RELIEVE EXCESSIVE SEALANT PRESSURE
John P. Oliver, Houston, Tex., assignor to Cameron Iron Works, Inc., Houston, Tex., a corporation of Texas
Filed Mar. 26, 1964, Ser. No. 354,962
10 Claims. (Cl. 137—246.22)

This invention relates generally to valves; and, more particularly, to improvements in valves having one or more lubricated seats.

Many valve seats are sealably slidable within the flowway through the valve body so as to be urged toward seating position by upstream or downstream line pressure. In some cases, each seat is so arranged and constructed as to be urged toward seating position by whichever pressure is predominant whether it be upstream or downstream of the seat. Normally, a spring or other resilient means is employed to provide a force for initially urging the seat to seating position so that line pressure becomes effective to hold it in such position.

In many cases, the surfaces on the inner ends of the seats and the valve member are worn or scored so that it is difficult to seal between them. Therefore, valve seats are often "lubricated" by means of a viscous grease contained within a groove about the inner end of the seat to provide a film over the surface of the valve member opposite the groove. For this purpose, a conventional "grease gun" is attached to a fitting on the valve body which connects with passageways in the valve body and seat for conducting the lubricant to the groove at a desired pressure.

When the seats are pressure energized, the force with which each is urged against the valve member is, of course, dependent on the pressure differential across the seat. Thus, in the event this differential is low, such force may not be sufficient to maintain a seal between the inner end of the seat and the valve member, even when the seat is lubricated.

In order to stop such leaks, it has also been proposed to provide the seat with an area which is exposed to the lubricant pressure and which faces outwardly or away from the valve member to provide an additional force urging the seat inwardly toward seating position. More particularly, this area has been made larger than the oppositely facing area circumscribed by the inner and outer diameters of the groove on the inner end of the seat so as to provide a resultant force toward the valve member.

Although such an arrangement may overcome the leakage problem, it creates others when there is no control over the degree to which the lubricant is pressurized. Thus, when the lubricant pressure so applied is excessive, the seat may be forced against the valve member so tightly as to make it difficult to turn, and, in some cases, to actually injure the sealing surface of the valve member. Furthermore, when the lubricant is introduced into passageways connecting with an area about an outer diameter of the seat, as may be desired in the case of some types of valves, its pressure may become so high as to distort or even collapse the seat radially inwardly.

An object of this invention is to provide a valve having lubricated seats of such construction as to overcome these problems of excessive lubricant pressure, while at the same time maintaining the above-described advantages of prior valves of this type.

A more particular object is to provide a valve with a lubricated seat which has a groove on its inner end to provide a film of lubricant over the sealing surface of the valve member as well as an area thereon responsive to the pressure of such lubricant for urging the seat toward seated position, but which nevertheless is so constructed and arranged as to relieve the lubricant when the pressure thereof becomes excessive.

A still further object is to provide a valve of the character defined in the foregoing object wherein the seat is of such construction as to enable it to be urged toward seated position by line pressure from either the upstream or downstream side of the seat, whichever pressure is predominant.

These and other objects are accomplished, in accordance with the illustrated embodiments of the present invention, by a valve having a lubricated valve seat which, similarly to prior seats of the type described, has an outwardly facing area over which the lubricant is effective to urge the seat to seated position with a force dependent on the pressure applied to the lubricant, as well as an outwardly facing area over which line fluid is effective to urge the seat toward the valve member with a force dependent on its pressure. Additionally, the seat may be urged to seated position by a spring or other resilient means acting between it and the valve body. However, as distinguished from prior seats of this type, the groove on the inner end of the seat constructed in accordance with this invention is of such size as to provide an inwardly facing area responsive to the pressure of the lubricant which is larger than the oppositely facing area on the seat. Thus, the pressure responsive areas on the seat may be so designed that as long as the pressure of the lubricant is not excessive, the seating forces due to lubricant pressure and line pressure, as well as the force due to the spring when employed, will be greater than the oppositely directed force due to the lubricant within the groove, whereby the seat is maintained in seated position to prevent leakage therepast. However, when its pressure becomes excessive, the force due to the lubricant acting over the inwardly facing area of the groove overcomes the seating forces so as to cause the seat to move away from the sealing surface of the valve member and thereby relieve lubricant from the groove. More particularly, by a proper selection of the relative areas of the groove and the outwardly facing pressure responsive area, the seat may be designed to relieve lubricant when the pressure thereof reaches a predetermined value with respect to one or more of the forces making up the total seating force on the seat.

In the illustrated forms of the invention, the seat is sealed with respect to the valve body flowway by enlarged and reduced diameter surfaces thereabout to provide an outwardly facing annular pressure responsive area equal to the difference between the areas circumscribed by these surfaces. More particularly, in the preferred embodiments of the invention, the sealing surfaces are spaced axially of one another and passageway means in the seat connects the exterior of the seat between such surfaces with the groove in its inner end. In such a case, the lubricant pressure provides a force acting radially inwardly over an intermediate portion of the outer diameter of the seat, so that, if the pressure were permitted to exceed line pressure on the interior of the seat by an excessive amout, the seat could be distorted or even collapsed. However, as previously mentioned, the novel seat construction of this invention permits the area of the groove on its inner end to be so selected as to relieve the lubricant therefrom before the pressure differential across the seat becomes excessive.

In one embodiment of the invention, the seat is made of a one-piece body, although, in another embodiment, the seat body is made up of a first portion and a second portion sealably slidable about the first in a direction axially with respect to it. In this latter embodiment of the invention, the lubricant groove is formed in the inner end of the first seat body portion, and the enlarged sealing surface about the seat body is formed on the second portion thereof. More particularly, the second portion of the seat body shifts responsive to the resultant axial forces across it so as to provide an outwardly facing area on the seat body which is responsive to the predominant line pressure to urge the inner end of the seat to seated position. In either case, when the lubricant is introduced at a sufficiently high pressure, the second portion of the seat body is urged to a position relative to the first portion of the seat body in which it transmits the force due to the lubricant to the first seat body portion and thus to the inner end of the seat.

In the drawings, wherein like reference characters are used throughout to designate like parts:

FIG. 1 is a longitudinal sectional view of a valve having lubricated seats constructed in accordance with the first-mentioned embodiment of the present invention, and with the valve member thereof in flowway opening position;

FIG. 2 is an enlarged sectional view of part of one of the seats and part of the valve body of the valve of FIG. 1, but with the valve member moved to flowway closing position; and FIG. 3 is a view similar to FIG. 2, but illustrating part of a seat constructed in accordance with the second mentioned embodiment of the invention.

With reference now to the details of the above-described drawings, the valve shown in FIG. 1, and designated in its entirety by reference character 10, includes a valve body 11 having a flowway 12 therethrough and a valve member 13 movable within the body for opening and closing the flowway. More particularly, the valve member 13 has an opening 14 through a ball-shaped closure 15 thereof and upper and lower stems 16 and 17, respectively, on such closure to permit it to be rotated between positions in which the opening 14 is aligned with the flowway 12 to open same (FIG. 1) and in which a solid portion of the closure 15 of the valve member is disposed across the flowway to close same (FIG. 2).

The valve body 11 includes a central portion 18 having bearings 19 and 20 on the upper and lower sides thereof, respectively, for receiving the valve member stems 16 and 17. As shown in FIG. 1, the stem 16 extends through the bearing 19 to provide an external part for actuating the valve member. The inner surface 21 of this central body portion is shaped spherically and concentrically of the outer surface of ball-shaped closure 15 of valve member 13 to provide a cavity fitting closely thereabout.

The valve body 11 also includes tubular extensions 21 connected by welding 22 to the opening in each opposite end of central body portion 18. These tubular extensions have flanges 23 on their outer ends for connecting the valve in a pipeline and annular recesses 24 on their inner ends adjacent the valve member 13 for receiving seats 25 adapted to seal against opposite sides of the valve member in the closed position thereof. As shown in FIG. 1, the openings 26 through the seats are the same diameter as the valve member opening 14, and the openings 14 and 26 are in turn of the same diameter as the flowway 12 through the tubular extensions 21 of the valve body, so that the valve is "full opening" in the position of FIG. 1.

As described more fully in U.S. Patent No. 3,157,190, the central portion 18 of the valve body 11 may be split along a plane passing through the axis of the flowway and perpendicular to the axis of rotation of the valve member, and the split parts then assembled over the stems 16 and 17 and welded to one another to capture the valve member. At this time, the seats 25 may be assembled within the recesses 24 of each tubular extension 21, and the extensions and the seats moved into positions for mounting the seats and forming the welds 22 connecting the tubular extensions 21 to the openings in opposite sides of central portion 18 of the valve body. This, of course, also captures the seats against removal from the valve body except upon destruction of the welds 22.

As best shown in FIG. 2, the inner end of each tubular seat retainer 21 has a flange 27 disposed radially outwardly of the recess for seat 25 for fitting within a notch 29 about the opening through valve body portion 18. More particularly, the tubular extension 21 has a surface 30 which tapers outwardly from the flange 27 to provide a space between it and an outwardly facing surface 31 of the end of central body portion 18 to thereby define an annular groove to receive and also hold the central portion of the body and the tubular extension in properly aligned positions as the weld metal is being applied.

In its preferred form, the valve 10 also includes a means for rotating each seat 25 about its axis in response to operation of the valve so as to distribute wear about the seat. Thus, as shown in FIG. 1, a dog 32 is carried on each upper side of the valve member 13 for engaging with the disengaging from teeth 33 about the periphery of the seat 25 as the valve member is rotated between opened and closed positions. A detailed explanation of the construction and operation of these parts can be found in the aforementioned copending application.

As shown in FIG. 2, each seat 25 of this first embodiment of the invention includes an annular one-piece body 34 having a groove 35 in its inner end for disposal opposite the valve member 13. As previously mentioned, this groove is adapted to contain a viscous grease to provide a sealing film across oppositely disposed surface of the valve member. For this and other purposes to be described, the body 34 of the seat has a passageway 45 therein for connecting the groove with a passageway 36 in the valve body to which a fitting 37 is connected to permit lubricant to be injected through the passageway and into the groove at a desired pressure. Thus, the outer end of the valve body passageway 36 has threads 38 thereabout to receive threads 39 of the fitting, which may be of conventional construction including a hollow body 40 having a restricted opening 41 into an enlarged chamber 42 and normally closed by a spring-pressed ball 43. The outer end of the hollow body is threaded or otherwise prepared to receive a conventional grease gun.

As can be seen from FIG. 2, the inner end of passageway 36 connects with the recess 24 in the flowway through the valve body, and the outer end of passageway 46 connects with an outer diameter portion of the seat body intermediate its inner and outer ends. Also, seal rings 51 and 52 are carried within grooves in the recess 24 of the valve body for sealing engagement with the outer diameter of the seal body on opposite sides of the inner end of passageway 36 and outer end of passageway 45. In this way, lubricant is confined for flow from the passageway 36 into the passageway 45, and thus into the groove 35 on the inner end of the seat body.

As will be appreciated from the drawings, this arrangement of the passageways permits the seat to accommodate more readily to the valve member since the seat body is free not only to move in an axial direction, but also to rock to a certain extent. As previously mentioned, although this creates an annular area about the seat body over which lubricant is effective to provide a radially inwardly directed force on such body tending to collapse same, the present invention provides a way in which the lubricant may be relieved from this area when its pressure exceeds the line pressure on the interior of the seat an excessive amount.

A seal ring 53 is carried on and protrudes from the inner end of the seat body 34 for sealing against the outer surface of the valve member 13 radially outwardly of the groove 35. The protruding end of this seal ring 53 is initially urged into sealing engagement with the valve member by means of a washer type spring 54 or other resilient means acting between an enlarged portion of the seat recess 24 and the outer side of the enlarged inner end portion of seat body 34. More particularly, the radially outer contact area of the seal ring 53 is no larger than the outer diameter portion of the seat body with which seal ring 51 is engaged. Thus, as long as the upstream pressure within the seat 25 is higher than the downstream pressure within the valve body cavity, such upstream pressure will urge the inner end of the seat toward the valve member. More particularly, this additional inward force on the seat will cause the inner end of seal ring 53 to be depressed so that the inner end of the seat body moves into engagement with the valve member.

If there is nevertheless leakage past the seat, the lubricant system may then be put into operation. As previously described, the lubricant introduced into the groove 35 provides a sealing film over the surface of the valve member. Additionally, the lubricant pressure acts over an outwardly facing area on the seat body to drive its inner end more tightly against the valve member. For this latter purpose, and as previously described, the outer diameter portion of the seat body with which seal ring 51 engages is larger than the outer diameter portion thereof with which seal ring 52 engages. Thus, there is an annular area $A_1$ between the two diameter portions which faces outwardly so as to be acted upon by the lubricant in the space between the seal rings.

However, when the inner end of the seat body is forced against the valve member, the lubricant pressure also acts over the inwardly facing area $A_2$ on such seat body which is circumscribed between the inner and outer diameters of the groove. As previously described, and in accordance with this invention, the area $A_2$ is larger than the oppositely facing area $A_1$ so that the force due to lubricant pressure which urges the seat away from the valve member is larger than the force due to lubricant pressure which urges it toward the valve member. As a result, lubricant will be relieved from the groove when its pressure becomes excessive. More particularly, the areas $A_1$ and $A_2$ may be so designed that the unseating force will overcome the total seating forces when such pressure reaches a predetermined point.

The valve shown in FIG. 3, and illustrating the second embodiment of valve seat 25a, is similar in many respects to the valve shown and described in connection with FIGS. 1 and 2. In fact, it is contemplated that the valve body including the recess 24 for the seat, the grease fitting 37, the passageway 36, and the seal rings 51 and 52 about the recess may be identical to that of the valve body 11. Similarly, the seat 25a may be initially urged against the valve member by a spring 54 acting between it and the recess 24 in the valve body flowway; and the valve member may carry means similar to that shown in FIG. 1 engagable with teeth 33 about the seat for rotating it during operation of the valve.

As previously described, the seat 25a differs from seat 25 in that it comprises a body 34a having first and second portions 55 and 56, respectively, with the second portion being disposed about the first portion for sliding axially with respect thereto. More particularly, and as shown in FIG. 3, the groove 35 and the teeth 33 are formed on and the seal ring 53 is carried by the inner end of the first seat body portion 55, and the spring 54 acts between the valve body and an enlarged inner end of the first seat body portion. The valve body passageway 36, on the other hand, is connected with the groove 35 for conducting lubricant from the fitting 37 to the groove by means of a passageway 48 in the second seat body portion and a passageway 47 in the first seat body portion.

Thus, the outer end of first seat body portion 55 has a cylindrical surface 44 of reduced outer diameter and extending outwardly from shoulder 57 on the enlarged inner end thereof. The second seat body portion 56 has seal rings 49 and 50 within grooves on the interior thereof for sealably sliding over the cylindrical surface 44 on opposite sides of the inner end of passageway 48 and outer end of passageway 47. Axially spaced outer diameter portions on the exterior of seat body portion 56 are, on the other hand, sealably slidable over the seal rings 51 and 52 on opposite sides of the outer end of the passageway 48. Thus, whether the seat body portion 56 is shifted to its rightmost position to engage with an inwardly facing shoulder 46 on the valve body recess, as shown in FIG. 3, or to its leftmost position to engage with shoulder 57 on seat body portion 55, lubricant is nevertheless confined for flow from the passageway 36 through the passageway 48 and 47 into the groove 35.

Assuming that the seal ring 53 on seat body portion 55 has been urged by spring 54 into initial engagement with the valve member, and upstream line pressure within the seat is higher than the body cavity pressure, the seat portion 56 will be shifted to the left and into engagement with shoulder 57. Mor particularly, this seat body portion will so shift because the predominant pressure upstream of the seat acts over the outer end of seat body portion 56 intermediate seal rings 50 and 52 and through the passageways 47 and 48 across the outwardly facing area between seal rings 51 and 52 and thus over a total area equal to the inwardly facing area of the inner end of the seat body portion between the rings 49 and 51.

As in the case of the one-piece body 34 of valve seat 25, the outer diameter of body portion 56 of seat 25a which is slidably engageable with seal ring 51 is at least as large as the outer contact surface of the seal ring 53. Consequently, when seat body portion 56 has been so shifted, the predominant upstream pressure will provide a force urging the inner end of the seat against the valve member. On the other hand, the inner diameter of seal ring 49 which is slidable over cylindrical surface 44 is no greater than the inner contact surface of seal ring 53. Thus, assuming that the downstream pressure predominates, whereby seat body portion 56 is normally shifted to the right as shown in FIG. 3, such pressure will also provide a force urging the seat against the valve member.

As in the case of the valve of FIGS. 1 and 2, the seal ring 51 of the valve of FIG. 3 surrounds an enlarged outer diameter surface of the seat 25a and is disposed axially inwardly of the seal ring 52 which surrounds a reduced diameter surface of such seat, whereby the seat is provided with an outwardly facing annular area $A_1$ thereon responsive to lubricant pressure. Although these enlarged and reduced diameter surfaces of the seat are disposed about the shiftable seat body portion 56, this portion will in any case be urged by the lubricant pressure into fore-transmitting relation with respect to seat body portion 55. That is, the force of the lubricant acting over pressure area $A_1$ will urge the portion of 56 to the left and into engagement with shoulder 57. Also, and similarly to seat 25, the area $A_1$ on the seat 25a is less than the area $A_2$ defined between the inner and outer diameters of groove 35, so that the seat may be so designed as to relieve lubricant pressure when it becomes excessive.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve, comprising a body having a flowway therethrough, a valve member movable within the body for opening and closing the flowway, a seat within the flowway on one side of the valve member and having a groove about its inner end for disposal opposite said one side of the valve member, means providing a resultant outwardly facing pressure responsive area on the seat body which is responsive to fluid pressure to urge the inner end of the seat against the valve member, but which is smaller than the inwardly facing pressure responsive area of the groove, and passageway means for introducing lubricant at a desired pressure to the outwardly and inwardly facing pressure responsive areas on the seat so as to so urge the inner end of the seat against the valve member until the pressure of said lubricant reaches a predetermined value.

2. A valve, comprising a body having a flowway therethrough, a valve member movable within the body for opening and closing the flowway, an annular seat within the flowway on one side of the valve member, said seat comprising a body having a groove about its inner end for disposal opposite said one side of the valve member and defining an inwardly facing surface on the seat body between the inner and outer diameters of the groove, means providing sliding seals between enlarged and reduced diameter portions of the seat body and the valve body to define an outwarly facing annular surface on the seat body, and passageway means in the valve body and seat body for introducing lubricant at a desired pressure to the outwardly facing annular surface on the seat body and the inwardly facing surface thereon, the lubricant pressure responsive area of the inwardly facing annular surface on the seat body being larger than the lubricant pressure responsive area on the outwardly facing annular surface on the seat body.

3. A valve, comprising a body having a flowway therethrough, a valve member movable within the body for opening and closing the flowway, an annular seat within the flowway on one side of the valve member, said seat comprising a body having a groove about its inner end for disposal opposite said one side of the valve member, said seat body and valve body flowway having enlarged and reduced diameter portions, means providing sliding seals between the enlarged and reduced diameter portions of the seat body and the valve body flowway with the enlarged diameter portion being disposed axially inwardly of the reduced diameter portion to provide an outwardly facing pressure responsive area on the seat body, a passageway in the valve body for introducing lubricant at a desired pressure to the outwardly facing area on the seat, and passageway means in the valve body seat connecting said outwardly facing area with the groove for conducting lubricant thereto, the inwardly facing pressure responsive area of the groove being larger than said outwardly facing pressure responsive area on the seat body.

4. A valve of the character defined in claim 3, wherein said seal providing means comprise axially spaced-apart seal rings about the seat body, and said valve body passageway and seat body passageway means connect with the flowway and the exterior of the seat body, respectively, intermediate the seal rings.

5. A valve of the character defined in claim 4, wherein each seal ring is carried within a groove about one of said seat body and valve body flowway.

6. A lubricated valve seat, comprising an annular body having a groove about its inner end, means providing enlarged and reduced diameter sealing surfaces about the body to define an outwardly facing annular pressure responsive area on the body, and passageway means in the body connecting the exterior thereof intermediate the sealing surfaces with the groove for conducting lubricant into the groove at a desired pressure, the inwardly facing annular pressure responsive area on the groove being larger than the outwardly facing annular pressure responsive area on the body.

7. A lubricated valve seat, comprising an annular body having an inner end and an outer end, a groove about the inner end of the body, axially spaced-apart enlarged and reduced diameter sealing surfaces about the body intermediate its inner and outer ends to provide an outwardly facing annular pressure responsive area thereon, and passageway means in the body connecting the exterior thereof intermediate the sealing surfaces with the groove for conducting lubricant into the groove at a desired pressure, the inwardly facing annular area defined between the inner and outer diameters of the groove being larger than the outwardly facing annular pressure responsive area on the body.

8. A lubricated valve seat of the character defined in claim 7, wherein the seat body is one piece.

9. A lubricated valve seat of the character defined in claim 7, wherein the seat body comprises a first portion and a second portion sealably slidable about the first portion in a direction axially thereof, the groove being formed in the first portion, and at least the enlarged diameter sealing surface being formed on the second portion.

10. A lubricated valve seat of the character defined in claim 7, wherein said seat body comprises relatively axially slidable tubular portions, spaced-apart seal rings sealing between the portions, one such portion having the groove therein and the other portion having the sealing surfaces thereabout, and the passageway means comprises a first passageway connecting the groove with the exterior of the one portion intermediate the seal rings and a second passageway connecting the interior of the other portion intermediate the seal rings with the exterior of said other portion intermediate said sealing surfaces.

References Cited

UNITED STATES PATENTS

| | | | |
|---|---|---|---|
| 2,030,458 | 2/1936 | McKellar | 137—246.22 |
| 2,837,308 | 6/1958 | Shand | 251—174 |
| 3,078,865 | 2/1963 | Estes | 137—246.12 X |
| 3,123,078 | 3/1964 | Brooks | 137—246.22 |
| 3,132,837 | 5/1964 | Britton | 251—174 X |
| 3,135,285 | 6/1964 | Volpin | 137—246.12 |
| 3,181,552 | 5/1965 | Jackson | 137—246.12 |
| 3,215,157 | 11/1965 | Anderson | 137—246 |
| 3,241,808 | 3/1966 | Allen | 137—330 X |

CLARENCE R. GORDON, *Primary Examiner.*